US005654475A

United States Patent [19]

Vassiliou et al.

[11] Patent Number: 5,654,475

[45] Date of Patent: *Aug. 5, 1997

[54] METHODS OF MAKING INTERMEDIATE OXIDATION PRODUCTS BY CONTROLLING OXIDATION RATES IN AN ATOMIZED LIQUID

[75] Inventors: Eustathios Vassiliou, Newark, Del.; Mark William Dassel, Indianola, Wash.

[73] Assignee: Twenty-First Century Research Corporation, Newark, Del.

[ * ] Notice: The term of this patent shall not extend beyond the expiration date of Pat. No. 5,502,245.

[21] Appl. No.: 620,974

[22] Filed: Mar. 25, 1996

[51] Int. Cl.$^6$ .................... C07C 51/16

[52] U.S. Cl. .................... 562/413; 562/512.4; 562/528; 562/538; 562/543; 562/529; 568/357; 568/358; 568/570; 568/836

[58] Field of Search .................... 562/413, 512.4, 562/528, 538, 543, 529; 568/357, 358, 570, 836

[56] References Cited

U.S. PATENT DOCUMENTS

| | | | |
|---|---|---|---|
| 1,121,532 | 12/1914 | Newberry . | |
| 2,014,044 | 9/1935 | Haswell | 75/17 |
| 2,301,240 | 11/1942 | Baumann | 183/115 |
| 2,980,523 | 4/1961 | Dille et al. | 48/215 |
| 3,530,185 | 9/1970 | Pugi | 260/586 |
| 3,613,333 | 10/1971 | Gardenier | 55/89 |
| 3,677,696 | 7/1972 | Bryk et al. | 23/2 |
| 3,928,005 | 12/1975 | Laslo | 55/73 |
| 3,987,100 | 10/1976 | Barnette et al. | 260/586 |
| 4,039,304 | 8/1977 | Bechthold et al. | 55/10 |
| 4,065,527 | 12/1977 | Graber | 261/79 A |
| 4,308,037 | 12/1981 | Meissner et al. | 55/10 |
| 4,361,965 | 12/1982 | Goumondy et al. | 34/57 |
| 4,370,304 | 1/1983 | Hendriks et al. | 422/224 |
| 4,394,139 | 7/1983 | Board | 55/20 |
| 4,423,018 | 12/1983 | Lester, Jr. et al. | 423/243 |
| 4,494,596 | 1/1985 | Bradshaw | 165/20 |
| 5,061,453 | 10/1991 | Krippl et al. | 422/106 |
| 5,123,936 | 6/1992 | Stone et al. | 55/8 |
| 5,170,727 | 12/1992 | Nielsen | 110/346 |
| 5,221,800 | 6/1993 | Park et al. | 562/543 |
| 5,244,603 | 9/1993 | Davis | 261/87 |
| 5,270,019 | 12/1993 | Melton et al. | 422/234 |
| 5,271,904 | 12/1993 | Esposito et al. | 422/105 |
| 5,286,458 | 2/1994 | Yang et al. | 422/168 |
| 5,294,378 | 3/1994 | Succi et al. | 261/130 |
| 5,312,567 | 5/1994 | Kozma et al. | 261/87 |
| 5,321,157 | 6/1994 | Kollar | 562/543 |
| 5,360,594 | 11/1994 | Meijer | 422/37 |
| 5,396,850 | 3/1995 | Conochie et al. | 110/346 |
| 5,399,750 | 3/1995 | Burn et al. | 522/553 |
| 5,463,119 | 10/1995 | Kollar | 562/543 |
| 5,502,245 | 3/1996 | Dassel et al. | 562/413 |

*Primary Examiner*—Samuel Barts
*Attorney, Agent, or Firm*—E. Vassiliou

[57] ABSTRACT

Methods of making intermediate oxidation products by atomizing a first liquid (in the form of droplets) containing a reactant into a gas containing an oxidant in a manner to form an intermediate oxidation product different than carbon monoxide and/or carbon dioxide. The oxidation rate is controlled by monitoring and adjusting the temperatures and/or conversions at critical points of the process.

22 Claims, 1 Drawing Sheet

METHODS OF MAKING INTERMEDIATE OXIDATION PRODUCTS BY CONTROLLING OXIDATION RATES IN AN ATOMIZED LIQUID

FIELD OF THE INVENTION

This invention relates to methods of making intermediate oxidation products, wherein a first reactant incorporated in an atomized liquid reacts with a gas containing an oxidant, under controlled conditions.

BACKGROUND OF THE INVENTION

Reactions where a first reactant, dissolved in a liquid, reacts with a second reactant contained in a gas under increased surface area conditions are known to the art. Such reactions are carried out in devices as scrubbers, burners, reaction vessels, and the like, for example.

Atomization of liquids into a gaseous atmosphere is one of the above mentioned techniques described in the art. The atomization techniques for conducting reactions, disclosed in the art so far, are rather crude and lack innovative features for controlling such reactions with respect to: desired reaction product if the reaction product is an intermediate, yield in reaction product, conversion and conversion rate, temperature profiles in the reaction zone, average droplet size or diameter, evaporation rates, and the like. Actually in most, if not all, cases, the reaction product is substantially the final product expected under the crude overall conditions of the reaction. For example, in the case of a burner, where a fuel is atomized into an atmosphere of an oxygen-containing gas (such as air for example), the final product of reaction is carbon dioxide, with desired minimization of carbon monoxide and nitrogen oxides as much as possible. In another example, a scrubber for removing acidic compounds from a gas may use an atomized liquid containing alkali or alkaline earth compounds which react with the acidic compounds in the gas to form the corresponding salts. In still another example, ammonia and phosphoric acid react under atomization conditions to form ammonium orthophosphate, which is a final reaction product.

On the other hand, reactions which are geared to produce intermediate products, especially in the case of oxidations, are not run under atomization conditions, since atomization promotes complete reactions to a final product. For example, oxidation of cyclohexane to adipic acid, or oxidation of p-xylene to terephthalic acid, have not been reported to be conducted under atomization conditions, and there is no incentive in the art to do so, since burning of cyclohexane to carbon dioxide has been expected to take place under such conditions. However, the inventors have discovered that in the presence of unexpected intricate critical controls and requirements of the instant invention, intermediate reaction or oxidation products, such as adipic acid, phthalic acid, isophthalic acid and terephthalic acid, for example, may be advantageously obtained under atomization conditions.

The following references, among others, describe processes conducted in intermixing liquid with gaseous materials, mostly under increased surface area conditions.

U.S. Pat. No. 5,399,750 (Brunet al.) discloses methods for preparing maleamic acid (aminomaleic acid) by reacting gaseous ammonia with molten maleic anhydride under reactant contact conditions of high surface area, for example reacting said gaseous $NH_3$ with a thin film of said molten maleic anhydride or with said molten maleic anhydride in a state of vigorous agitation.

U.S. Pat. No. 5,396,850 (Conochie et al.) discloses a method of destroying organic waste in a bath of molten metal and slag contained in a vessel. The method comprises injecting organic waste into the bath to form a primary reaction zone in which the organic waste is thermally cracked and the products of the thermal cracking which are not absorbed into the bath are released into the space above the surface of the bath. The method further comprises injecting an oxygen-containing gas toward the surface of the bath to form a secondary reaction zone in the space above the surface of the bath in which the oxidizable materials in the products from the primary reaction zone are completely oxidized and the heat released by such oxidation is transferred to the bath. In order to facilitate efficient heat transfer from the second reaction zone to the bath, the method further comprises injecting an inert or other suitable gas into the bath to cause molten metal and slag to be ejected upwardly from the bath into the secondary reaction zone.

U.S. Pat. No. 5,360,594 (Meijer) discloses a control system for regulating the decontamination of waste in a reaction chamber. The control system monitors the chamber temperature and disinfectant concentration. Using the disinfectant concentration, the control system then calculates the minimum temperature required to maintain a specified level of decontamination.

U.S. Pat. No. 5,312,567 (Kozma et al.) discloses a complex mixing system with stages consisting of propeller mixers of high diameter ratio, where the blades are provided with flow modifying elements, whereby the energy proportions spent on dispersion of the amount of gas injected into the reactor, homogenization of the multi-phase mixtures, suspension of solid particles, etc. and the properties corresponding to the rheological properties of the gas-liquid mixtures and to the special requirements of the processes can be ensured even in extreme cases. Open channels opposite to the direction of rotation are on the blades of the dispersing stage of the propeller mixers fixed to a common shaft, where the channels are interconnected with gas inlet. The angle of incidence of a certain part of the blades of mixing stages used for homogenization and suspension is of opposite direction and the length is shorter and/or the angle of incidence is smaller than those of the other blades. Baffle bars are on the trailing end of the blades on a certain part of the propeller mixers used similarly for homogenization and suspension, and/or auxiliary blades at an angle of max. 20° to the blade wings are arranged above or below the trailing end of the blades.

U.S. Pat. No. 5,294,378 (Succi et al.) discloses a calibrating apparatus for isothermically introducing, into a system of dry gas, amounts of moisture lower than 1000 ppb.

U.S. Pat. No. 5,286,458 (Young et al.) discloses an injection non-catalyst denitrogen oxide process control system, in which a reducing agent (such as ammonia), carriers and additional gases are injected into the flue gas of a combustion device.

U.S. Pat. No. 5,271,904 discloses an apparatus, according to which, a sheath is used to house a conventional pH sensor within the sheath's interior. The sheath is exposed to a descending spray within a sulfur dioxide absorber. A fill port collects a portion of the spray and the sheath accumulates the collected spray as a slurry sample within its interior. The pH sensor becomes immersed in the sample slurry. Slurry is discharged from the interior by the way of drain notches and drain holes. Discharged sample slurry descends to enter a bulk slurry to allow recycling. A steady state of slurry collection and slurry discharge is reached such that the sample slurry is continuously refreshed. Elevation of the sheath over the bulk slurry prevents slurry from the bulk from entering into the slurry sample.

U.S. Pat. No. 5,244,603 (Davis) discloses a gas-liquid mixing system which employs an impeller/draft tube assembly submerged in liquid. Hollow eductor tubes affixed to the impeller drive shaft are used to flow gas from an overhead gas space to the liquid in the vicinity of the assembly. The positioning and size of the eductor tubes are such as to maximize the desired gas-liquid mixing and reaction rate.

U.S. Pat. No. 5,270,019 (Melton et al.) discloses an elongated, generally vertically extending concurrent reactor vessel for the production of hypochlorous acid by the mixing and reaction of a liquid alkali metal hydroxide and a gaseous halogen, wherein an atomizer is mounted near the top of the reactor vessel to atomize the liquid alkali metal hydroxide into droplets in the vessel. The vessel has a spraying and reaction zone immediately beneath the atomizer and a drying zone beneath the spraying and reaction zone to produce a gaseous hypochlorous acid and a substantially dry solid salt by-product.

U.S. Pat. No. 5,170,727 (Nielsen) discloses a processes and apparatus in which supercritical fluids are used as viscosity reduction diluents for liquid fuels or waste materials which are then spray atomized into a combustion chamber. The addition of supercritical fluid to the liquid fuel and/or waste material allows viscous petroleum fractions and other liquids such as viscous waste materials that are too viscous to be atomized (or to be atomized well) to now be atomized by this invention by achieving viscosity reduction and allowing the fuel to produce a combustible spray and improved combustion efficiency. Moreover, the present invention also allows liquid fuels that have suitable viscosities to be better utilized as a fuel by achieving further viscosity reduction that improves atomization still further by reducing droplet size which enhances evaporation of the fuel from the droplets.

U.S. Pat. No. 5,123,936 (Stone et al.) discloses a process and apparatus for removing fine particulate matter and vapors from a process exhaust air stream, and particularly those emitted during post-production curing or post-treatment of foamed plastics, such as polyurethane foam, in which the exhaust air stream is passed through a transfer duct into which is introduced a water spray in the form of a mist of fine droplets in an amount which exceeds the saturation point; thereafter the exhaust air stream is introduced into a filter chamber having a cross-sectional area that is substantially greater than that of the transfer duct, and the exhaust air stream passes through at least one, and preferably a plurality of high surface area filters, whereby a portion of the water is removed from the exhaust air stream and collected in the filter chamber prior to the discharge of the exhaust air stream into the environment.

U.S. Pat. No. 5,061,453 (Krippl et al.) discloses an apparatus for continuously charging a liquid reactant with a gas. The gas is dispersed in the reactant through a hollow stirrer in a gassing tank. The quantity of gas introduced per unit time is kept constant.

U.S. Pat. No. 4,494,596 (Bradshaw) discloses an air-conditioning system for adjusting air temperature and humidity to a predetermined level for the air supply to a paint spray booth.

U.S. Pat. No. 4,423,018 (Lester, Jr. et al.) discloses a process according to which a by-product stream from the production of adipic acid from cyclohexane, containing glutaric acid, succinic acid and adipic acid, is employed as a buffer in lime or limestone flue gas scrubbing for the removal of sulfur dioxide from combustion gases.

U.S. Pat. No. 4,494,139 (Board) discloses a direct contact condenser and a separating method. The housing of the direct contact condenser has a partition with a manifold water supply adapted to discharge water to the opposite sides of the partition. A plurality of showers are disposed below the elevation of the water supply and through which a gas stream will pass sequentially. Each shower receives water from one side of the partition. The last shower is provided with temperature sensors which are connected to a valve for controlling water flow in response to either the temperature of the fluid and the water in the last shower.

U.S. Pat. No. 4,370,304 (Hendriks et al.) discloses methods by which ammonium orthophosphate products are prepared by reacting ammonia and phosphoric acid together at high speed under vigorous mixing conditions by spraying the reactants through a two-phase, dual coaxial mixer/sprayer and separately controlling the supply and axial outflow rate of the phosphoric acid at 1 to 10 m/sec. and the outflow rate of ammonia at 200 to 1000 m/sec. (N.T.P.). Thorough mixing and a homogenous product is obtained by directing the outflow spray into a coaxial cylindrical reaction chamber of a specified size with respect to the diameter of the outermost duct of the sprayer/mixer. The product may be granulated on a moving bed of granules and adjusted in respect of the $NH_3$ to $H_3PO_4$ content by changing the concentration of the phosphoric acid and/or supplying additional ammonia to the granulation bed.

U.S. Pat. No. 4,361,965 (Goumondy et al.) discloses a device for atomizing a reaction mixture, said device enabling the reaction mixture to be atomized in a reactor with the aid of at least a first gas and an atomizing nozzle. This device further comprises a supply of a second hot gas at the top of the atomizing device, serving to dry the atomized mixture, a supply of a third gas and means for distributing this third gas comprising an annular space of adjustable width and adapted to distribute in the reactor said third gas in the form of a ring along the inner wall of the reactor, so as to avoid any contact between the reaction mixture and said wall. The invention is applicable to the atomization of a reaction mixture.

U.S. Pat. No. 4,308,037 (Meissner et al.) discloses methods according to which high temperature thermal exchange between molten liquid and a gas stream is effected by generating in a confined flow passageway a plurality of droplets of molten liquid and by passing a stream through the passageway in heat exchange relationship with the droplets. The droplets are recovered and adjusted to a predetermined temperature by means of thermal exchange with an external source for recycle. The process provides for removal of undesired solid, liquid or gaseous components.

U.S. Pat. No. 4,065,527 (Graber) discloses an apparatus and a method for handling a gas and a liquid in a manner to cause a specific interaction between them. The gas is placed into circulation to cause it to make a liquid circulate in a vortex fashion to present a liquid curtain. The gas is then passed through the liquid curtain by angled vanes to cause the interaction between the two fluids, such as the heating of the liquid, scrubbing of the gas, adding a chemical to the liquid and the like. The vanes are spaced apart and project inwardly from the inner periphery of an annular support so that the circulating liquid readily moves into the spaces between the vanes to create the liquid curtain. A number of embodiments of the invention are disclosed.

U.S. Pat. No. 4,039,304 (Bechthold et al.) discloses methods according to which waste gas is contacted with a solution of a salt from a pollutant of the gas. This solution is obtained from another stage of the process used for cleaning or purifying the gas. The resulting mixture of gas and solution is subjected to vaporization so as to obtain a dry gaseous substance constituted by the waste gas and the evaporated solvent for the salt. The gaseous substance thus formed contains crystals of the salt as well as the pollutant present in the original waste gas. The salt crystals and other solid particles are removed from the gaseous substance in the form of a dry solids mixture. The gaseous substance is subsequently mixed with an absorption fluid such as an ammonia solution in order to wash out and redissolve any salt crystals which may remain in the gaseous substance and in order to remove the pollutant present in the original waste gas from the gaseous substance. The pollutant and the redissolved salt crystals form a salt solution together with the absorption fluid and it is this salt solution which is brought into contact with the waste gas. The gaseous substance is exhausted to the atmosphere after being mixed with the absorption fluid.

U.S. Pat. No. 3,928,005 (Laslo) discloses a method and apparatus for treating gaseous pollutants such as sulfur dioxide in a gas stream which includes a wet scrubber wherein a compressed gas is used to atomize the scrubbing liquid and a nozzle and the compressed gas direct the atomized liquid countercurrent to the flow of gas to be cleaned. The method and apparatus includes pneumatically conveying to the nozzle a material such as a solid particulate material which reacts with or modifies the pollutant to be removed or altered. The gas used for atomizing the scrubbing liquid is also used as a transport vehicle for the solid particulate material. In the case of sulfur oxides, the material may be pulverized limestone.

U.S. Pat. No. 3,677,696 (Helsinki et al) discloses a method according to which, the concentration of circulating sulfuric acid is adjusted to 80–98% by weight and used to wash hot gases containing mercury. The temperature of the acid is maintained between 70°–250° C., and the solid material separating from the circulating wash solution is recovered.

U.S. Pat. No. 3,613,333 (Gardenier) discloses a process and apparatus for removing contaminants from and pumping a gas stream comprising indirectly heat exchanging the gas and a liquid, introducing the liquid under conditions of elevated temperature and pressure in vaporized and atomized form into the gas, mixing same thereby entrapping the contaminants, and separating clean gas from the atomized liquid containing the contaminants.

U.S. Pat. No. 2,980,523 (Dille et al.) discloses a process for the production of carbon monoxide and hydrogen from carbonaceous fuels by reaction with oxygen. In one of its more specific aspects it is directed to a method of separating carbonaceous solid entrained in the gaseous products of reaction of carbonaceous fuels and oxygen wherein said products are contacted with a limited amount of liquid hydrocarbon and thereafter scrubbed with water, and said carbonaceous solid is decanted from said clarified water.

U.S. Pat. No. 2,301,240 (Baumann et al.) discloses an improved process for removing impurities from acetylene gas which has been prepared by thermal or electrical methods by washing with organic liquids, as for example oils or tars.

U.S. Pat. No. 2,014,044 (Haswell) discloses an improved method for treating gas and aims to provide for the conservation of the sensible heat of such gas.

U.S. Pat. No. 1,121,532 (Newberry) discloses a processes of recovering alkalis from flue-gases.

Currently, oxidation reactions for the production of organic acids, including but not limited to adipic acid, are conducted in a liquid phase reactor with reactant gas sparging. The reactant gas in these cases is typically air, but may also be oxygen. Sufficient reactant gas, with or without non-reactive diluents (e.g., nitrogen), is sparged—at relatively high rate—so that the liquid reaction medium is aerated to maximum capacity (typically 15–25% aeration). The relatively high sparging rates of reactant containing gas feed (hereinafter referred to as "reactant gas"), associated with this conventional approach, have several drawbacks:

Costly reactant gas feed compressors are required to compress makeup reactant gas for sparging. These are expensive to install and operate (high electric or steam consumption), and have many utility problems resulting in excessive plant downtime.

The required high gas rate makes it extremely difficult to control oxygen content in the reactor at low concentrations (due to the high reactor gas turnover rate).

The required high gas rate makes it extremely difficult to control reaction temperature at low production rates (i.e., high turndown rate) for a given sized reactor system. This occurs because the gas used for sparging removes energy from the reaction system by volatilizing reaction liquid and liquid solvent—this volatilization effect is quite significant at the relatively high temperatures commonly associated with and required for oxidation reactions. Unless carefully balanced by an exothermic heat of reaction, this volatilization will act to substantially lower the temperature of the liquid content of the reactor. Thus, a properly sparged system can be designed for good temperature control at medium to high production rates, but will suffer temperature loss and loss of temperature control at significant turndown rate.

High reactant gas feed rate results in relatively high reactor non-condensible off-gas rate. Non-condensible off-gases must either be totally purged to atmosphere, or—if oxygen content is high—partially purged and partially recycled to the reactor. The use of air as a reactant gas feed has drawbacks because it results in high rate of purge to the atmosphere—this is undesirable because this purge must first be cleaned in very expensive off-gas cleanup facilities in order to meet ever more stringent environmental requirements. The use of oxygen-only gas feed to the reactor may be undesirable because high sparging requirements result in low oxygen conversion in the reactor; low conversion results in high oxygen concentration within the reactor; and high oxygen concentration within the reactor may result in excessive over-oxidation of liquid reactants and liquid solvents with attendant high chemical yield loss (i.e., burning these to carbon monoxide and carbon dioxide). If the oxygen in the reactor is diluted with recycle nitrogen or gaseous-recycle inerts, then both high recompression investment and costs, and recompression utility problems are introduced.

The current technology also suffers from a relatively low ratio of gas-liquid surface area to liquid reaction mass. The presently available art does not maximize this ratio. In contrast, the present invention maximizes said ratio in order:

to increase reaction rate by increasing the mass transfer rate of gaseous reactants (oxygen) to liquid reaction sites; and so as to enable economic operation at relatively low oxygen concentration in the gas phase.

Another problem with the current technology is the sometimes formation of large agglomerations of insoluble oxidation products in the reactor. These can build up on reactor walls resulting in decreased available reaction volume, and in unwanted by-product formation due to over-exposure of said accretions to reaction conditions (e.g., high temperature) in oxygen-starved micro-reactor environments. These can also form large diameter, heavy solids in the reactor which can result in damage to expensive reactor agitator shafts and agitator seals resulting in costly repairs and high utility wear-problems. Finally, the current technology often requires expensive agitation shafts and seals capable of withstanding corrosive chemical attack and containing high system pressures.

Substituting gas-phase reaction systems for liquid-phase reactors introduces new problems, chief among which is the difficulty of identifying a cost-effective, efficient, non-plugging, long-lived catalyst system. Liquid-phase catalyst systems are well-developed and well-understood. Unfortunately, these are non-volatile. Using a non-volatile catalyst in a gas-phase reaction system must necessarily often be subject to severe plugging problems as most organic acids resulting from oxidation reactions are non-volatile solids—unless dissolved in a liquid reaction medium.

There is a plethora of references dealing with oxidation of organic compounds to produce acids, such as, for example, adipic acid.

The following references, among the plethora of others, may be considered as representative of oxidation processes relative to the preparation of diacids.

U.S. Pat. 5,321,157 (Kollar) discloses a process for the preparation of $C_5$–$C_8$ aliphatic dibasic acids through oxidation of corresponding saturated cycloaliphatic hydrocarbons by (1) reacting, at a cycloaliphatic hydrocarbon conversion level of between about 7% and about 30%, (a) at least one saturated cycloaliphatic hydrocarbon having from 5 to 8 ring carbon atoms in the liquid phase and (b) an excess of oxygen gas or an oxygen containing gas mixture in the presence of (c) less than 1.5% moles of a solvent per mole of cycloaliphatic hydrocarbon (a), wherein said solvent comprises an organic acid containing only primary and/or secondary hydrogen atoms and (d) at least about 0.002 mole per 1000 grams of reaction mixture of a poly valent heavy metal catalyst; and (2) isolating the C5–C8 aliphatic dibasic acid.

U.S. Pat. No. 5,463,119 (Kollar) discloses a process for the preparation of $C_5$–$C_8$ aliphatic dibasic acids, similar to the one described in U.S. Pat. No. 5,321,157, with the main difference that after removing the adipic acid, the remaining matter is recirculated.

U.S. Pat. No. 5,221,800 (Park et al.) discloses a process for the manufacture of adipic acid, according to which cyclohexane is oxidized in an aliphatic monobasic acid solvent in the presence of a soluble cobalt salt wherein water is continuously or intermittently added to the reaction system after the initiation of oxidation of cyclohexane as indicated by a suitable means of detection, and wherein the reaction is conducted at a temperature of about 50° C. to 150° C., at an oxygen partial pressure of about 50 to about 420 pounds per square inch absolute.

The following references, among others, describe oxidation processes conducted in multi-stage and multi-plate systems.

U.S. Pat. No. 3,987,100 (Barnette et al.) describes a process of oxidizing cyclohexane to produce cyclohexanone and cyclohexanol, said process comprising contacting a stream of liquid cyclohexane with oxygen in each of at least three successive oxidation stages by introducing into each stage a mixture of gases comprising molecular oxygen and an inert gas.

U.S. Pat. No. 3,957,876 (Rapoport et al.) describes a process for the preparation cyclohexyl hydroperoxide substantially free of other peroxides by oxidation of cyclohexane containing a cyclohexane soluble cobalt salt in a zoned oxidation process in which an oxygen containing gas is fed to each zone in the oxidation section in an amount in excess of that which will react under the conditions of that zone.

U.S. Pat. No. 3,530,185 (Pugi) describes a process for manufacturing precursors of adipic acid by oxidation of an oxygen containing inert gas which process is conducted in at least three successive oxidation stages by passing a stream of liquid cyclohexane maintained at a temperature in the range of 140° to 200° C., and a pressure in the range of 50–350 psig through each successive oxidation stage in an amount such that substantially all the oxygen introduced into each stage is consumed in that stage thereafter causing the residual inert gases to pass countercurrent into the stream of liquid during the passage of the stream through said stages.

None of the above references, or any other references known to the inventors disclose, suggest or imply, singly or in combination, oxidation reactions to intermediate oxidation products under atomization conditions subject to the intricate and critical controls and requirements of the instant invention as described and claimed.

Our co-pending applications 08/477,195 (filed Jun. 7, 1995), 08/477,234 (filed Jun. 7, 1995, and to be issued on Mar. 26, 1996 as U.S. Pat. No. 5,502,245), 08/478,257 (filed Jun. 7, 1995), 08/475,340 (filed Jun. 7, 1995), and 08/587,967 (filed Jan. 17, 1996), all of which are incorporated herein by reference, describe methods and apparatuses relative to controlling reactions in atomized liquids.

SUMMARY OF THE INVENTION

As aforementioned, the present invention relates to methods of making intermediate oxidation products, wherein a first reactant incorporated in an atomized liquid reacts with a gas containing an oxidant, under controlled conditions. More particularly, this invention pertains a method of preparing an intermediate oxidation product from a first liquid containing a first reactant and a gas containing an oxidant, the method comprising the steps of atomizing the first liquid to form a plurality of droplets in the gas at an atomization temperature and at an atomization distance from a mass of a second liquid;

causing a substantially non-destructive oxidation at an oxidation rate between the first reactant and the oxidant to form the intermediate oxidation product;

coalescing the droplets into the mass of the second liquid; controlling the oxidation rate by adjusting a parameter or determinant selected from a group consisting of atomization temperature, droplet temperature, temperature of the second liquid, conversion of first reactant to intermediate product in the droplets, conversion of first reactant to intermediate product in the first liquid, conversion of first reactant to intermediate product in the second liquid, and a combination thereof, to be within respective predetermined ranges; and separating the intermediate oxidation product from the second liquid.

Preferably, the parameter or determinant is selected from a group consisting of droplet temperature, conversion of first reactant to intermediate product in the droplets, conversion of first reactant to intermediate product in the second liquid, and a combination thereof.

According to the instant invention, the droplets have an average droplet diameter and are produced at a desired first flow rate, the gas flows at a second flow rate, the droplets contain volatile ingredients volatilizing at a volatilization rate, the first liquid contains first reactant at a first content, the first liquid contains catalyst at a catalyst content, the gas contains oxidant at a second content, and adjusting said parameter is performed by a step selected from a group consisting of changing the atomization temperature, the reaction pressure, the atomization distance, the average droplet diameter, the first flow rate, the second flow rate, the volatilization rate, the first content, the second content, the catalyst content, and a combination thereof.

The method is particularly applicable in cases where a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

The methods of the present invention are even more in cases wherein the first reactant comprises a compound selected from a group consisting of cyclohexane, cyclohexanone, cyclohexanol, cyclohexylhydroperoxide, o-xylene, m-xylene, p-xylene, a mixture of at least two of cyclohexane, cyclohexanone, cyclohexanol, cyclohexylhydroperoxide, and a mixture of at least two of o-xylene, m-xylene, p-xylene.

the oxidant comprises oxygen; and a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

BRIEF DESCRIPTION OF THE DRAWING

The reader's understanding of this invention will be enhanced by reference to the following detailed description taken in combination with the drawing figure, wherein.

DETAILED DESCRIPTION OF THE INVENTION

Figure 1:
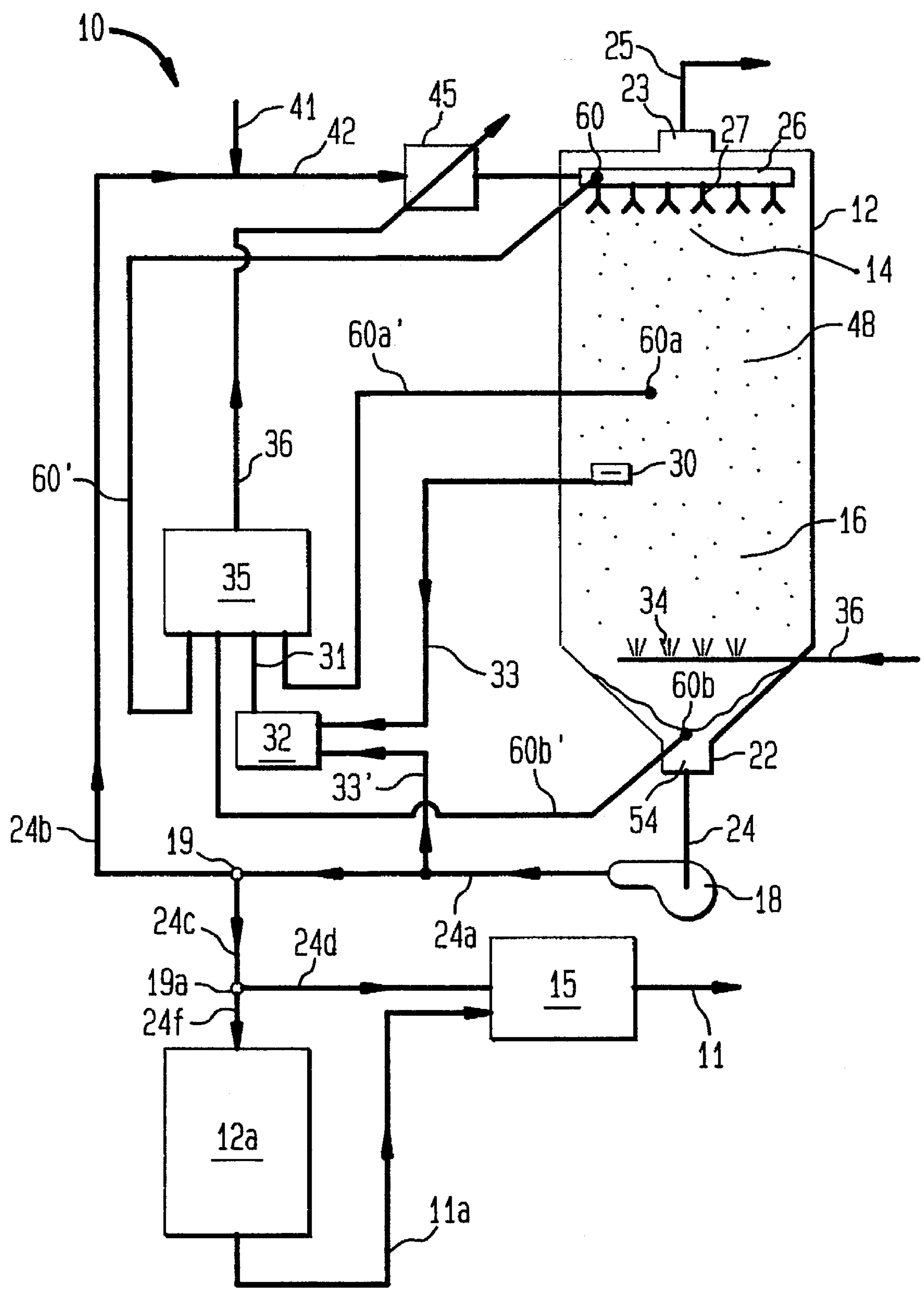
FIG. 1 illustrates schematically a preferred embodiment of the present invention, wherein oxidation rate of the reaction in a reaction chamber is controlled by adjusting the temperature and or conversion of first reactant to intermediate oxidation product at different locations of the system.

As aforementioned, the present invention relates to methods of making intermediate oxidation products, wherein a first reactant incorporated in an atomized liquid reacts with a gas containing an oxidant, under controlled conditions. According to the present invention, the atomization conditions are subject to intricate critical controls and requirements as described and claimed hereinbelow.

As also aforementioned, reactions which are geared to produce intermediate products, especially in the case of oxidations, have not been run under atomization conditions so far, since atomization promotes complete reactions to a final product. For example, oxidation of cyclohexane to adipic acid, or oxidation of p-xylene to terephthalic acid, have not been reported to be conducted under atomization conditions, and there is no incentive in the art to do so, since burning of cyclohexane to carbon dioxide has been expected to take place under such conditions. However, the inventors have discovered that in the presence of unexpected intricate critical controls and requirements of the instant invention, intermediate reaction or oxidation products, such as adipic acid, phthalic acid, isophthalic acid and terephthalic acid, for example, may be advantageously obtained under atomization conditions.

The present invention enables economic oxidation reactions at improved yield with reduced compression costs and investment, using proven catalyst systems, with reduced off-gas waste-stream discharge to the atmosphere, with reduced off-gas cleanup investment and costs, without solids plugging or buildup problems, with high utility, high conversion rates, and with reduced oxygen concentrations in the reaction chamber.

The ability to operate at lower oxygen concentration, if so desired, made possible by this invention, with acceptable conversion rates in the reactor improves yield by reducing over-oxidations, and may eliminate safety (explosion) problems associated with operation in the explosive oxygen/fuel envelope by operating in the non-explosive oxygen/fuel envelope. In the current technology, reducing oxygen content below traditional levels would result in a non-economic reduction in reaction rate. In this invention, however, a significant increase in the ratio of gas-liquid interfacial area to liquid reaction mass—relative to current levels—offsets this rate reduction, thereby enabling economic operation at reduced oxygen concentration in the reactor.

Some of the key elements, which may be present singly or in any combination thereof, in the embodiments of the present invention, are:

High productivity reaction volume;

Elimination of reactor agitator and agitator seals;

Efficient Catalyst Systems;

Low off-gas waste-stream rate;

Employment of an ultra-high ratio of gas/liquid interfacial area to liquid reaction volume;

Employment of an ultra-low ratio of liquid reaction volume to liquid volume contained in the liquid-film diffusion zone attached to the gas interface;

Variation and accurate control of the ratio of gas/liquid interfacial area to liquid reaction volume, and the ratio of liquid reaction volume to liquid volume contained in the liquid-film diffusion zone attached to the gas interface;

Multi-parameter control of liquid reactant conversion;

Multi-parameter control of liquid reaction mass temperature;

Avoidance of solids buildup in the reactor;

Internal condensation; and

Easy recovery of high purity, high oxygen-concentration off-gas for recycle with low recompression requirements.

This invention provides a more productive reaction volume than does the conventional technology. Reaction chamber productivity per unit liquid reaction volume is increased due to the greatly enhanced mass transfer rates afforded by this invention, coupled, if so desired, with measures to maximize droplet loading in the reaction chamber. Droplet loading in the reaction chamber may be maximized according to the present invention, by employing internal condensation and generating ultra-small liquid reaction droplets.

Conversion is defined as the ratio $(O^2-O^1)\times 100/R^1 xn$, where:

$O^1$ is the percent moles of intermediate oxidation product in the first liquid;

$O^2$ is the percent moles of intermediate oxidation product as provided to the conversion monitor by the sample collector;

$R^1$ is the percent moles of first reactant in the first liquid; and n is the number of moles of intermediate oxidation product produced when one mole of first reactant is completely converted to said intermediate oxidation product.

Although, in the case of atomizing reactors, pre-coalescing temperature, transient temperature difference, and transient conversion are of essence for controlling oxidation reactions, as described in our earlier referenced copending applications, and not just the overall temperature or conversion over the whole process, it has been recognized by the inventors that conversion and/or temperature at certain critical stages of the process are also critical and can be adjusted in a similar manner as described in said earlier referenced copending applications for pre-coalescing temperature, transient temperature difference, and transient conversion. Control of temperature and/or conversion at critical stages, not only helps in improving the yield, but in addition it helps in avoiding reactions leading to complete oxidation, combustion, or even explosion.

Temperature and/or conversion measured at different critical points are called determinants since they are determining parameters regarding control of the oxidation rate. Thus, the oxidation is driven by different variables, in a manner that the temperature at one or more critical points attains a value within a predetermined temperature range, and the conversion at the same or different critical points attains a value within a predetermined conversion range.

If more than one determinant is adjusted for controlling the reaction rate, the determinant which happens to be outside its respective predetermined range and further away from its respective most preferred set value takes preferably precedence or it is said to prevail. By this it is meant that the computerized controller, as described hereinbelow, temporarily assigns lower priority to data from the other determinants, and handles first the data received regarding the prevailing determinant. After the prevailing determinant has been closer to its respective most preferred set value than another determinant, the other determinant takes precedence or prevails. Thus, after all determinants are within their respective predetermined value ranges, the determinant further away from its respective most preferred set value takes precedence or prevails until all determinants attain their most preferred set value. No variables are changed at this point until one determinant deviates, at which point the sequence described above is initiated again, thus maintaining all determinants as close as possible to their respective preferred set values. This sequence is followed continuously with the goal to maintain all determinants within their respective predetermined ranges at all times, always driving each determinant toward the most preferred set value. When a determinant has to be chosen for taking precedence over another determinant, whether characterized by the same or different units, each respective predetermined range is divided in 100 arbitrary units, arbitrarily assumed to be equivalent in both cases, and all values are prorated within these equivalent arbitrary units (both inside each range and outside each range).

It is important to note that according to this invention, appropriate overriding program rules may be used to override the above sequences, especially in occasions involving safety matters. For example, if the temperature at a certain critical point starts rising at a rate faster than a preset value, the corresponding determinant should take over, regardless of precedence as described above, and cause commensurate change in one or more variables at a high enough rate to offset said rise on time, before any catastrophic outcome.

In addition, monitoring carbon monoxide and carbon dioxide in the off-gases is a prudent precaution, since unexpected or higher than normal amounts of carbon monoxide and/or carbon dioxide signify poorly controlled or uncontrolled oxidation. Similar overriding rules, applied by the controller described below, help prevent poor yields, poor conversions, and even explosions.

In a preferred embodiment of the present invention, better shown in FIG. 1, there is depicted a device 10 for preparing an intermediate oxidation product from a first liquid containing a first reactant and a gas containing a second reactant. The device 10 comprises a reaction chamber 12, which chamber has an upper end 14, and a lower end 16. The chamber 12 is preferably of cylindrical shape turning to conical at the vicinity of the lower end 16, and finally leading to a liquid outlet 22 connected to an outlet line 24. The outlet line 24 leads to a pump 18, which is connected to a first valve 19 though line **24*a*. The first valve 19 is adapted to connect line 24*a* to either line 24*b* or line 24*c* or partially to line 24*b* and partially to line 24*c*. Line 24*b* leads back to the reaction chamber 12 at an atomizer 26, preferably located at the upper end 14 of the reaction chamber 12. The atomizer 26 has preferably a plurality of nozzles 27, which more preferably are of the airless type, well known in the art. The atomizer 26 may be steady at a certain position of the reaction chamber 12**, or it may be movable, preferably in an up/down mode.

Line **24*c* leads to a second valve 19*a*, which is adapted to connect line 24*c* to either line 24*d*, or line 24*f*, or partially to line 24*d* and partially to line 24*f*. Line 24*d* leads to a separator 15 where the intermediate oxidation products are separated from reactants, unreacted reactants, usually containing various amounts of intermediate oxidation products, solvents, catalysts, and other adjuncts, return to a recirculation tank (not shown) through line 11. The separator may be as simple a device as a filter, or as complicated as a battery of tanks, washers, extractors, distillation columns, etc., suitable to each particular case. Line 24*f* leads to a device 12*a*, which may be another reaction chamber or a batteryof reaction chambers, or other devices including but not limited to of tanks, washers, extractors, distillation columns, etc. The device 12*a* is connected to separator 15 through line 11*a*, especially in the case that device 12*a*** is a simple reaction chamber or a battery of reaction chambers.

At the vicinity of the upper end 14 of the reaction chamber 12, there is provided a gas outlet 23 leading to an outlet gas line 25.

The reaction chamber 12 is preferably adapted to withstand such temperatures and pressures, which are appropriate for the reaction conditions in the reaction chamber 12, and be suitable for the reactants and reaction products. Such materials and construction characteristics are well known to the art. For example, depending on the particular reaction, carbon steel, stainless steel, or Hastalloy may be required. In addition, the inside surfaces of the reaction chamber may be protected by coatings or linings of vitreous or other materials.

A gas inlet 34, preferably located in the vicinity of the lower end 16 of the reaction chamber 12, is connected to a gas inlet feed line 36, which provides the gas containing the second reactant.

A thermocouple 60, or other temperature measuring means, is preferably disposed within the atomizer in order to measure the atomization temperature, which is the temperature of the first liquid just before being atomized. One or more thermocouples 60*a* are disposed within the reaction chamber 12, while thermocouple 60*b* is disposed within the second liquid 54 at the lower part of the reaction chamber 12, in order to measure the temperature of the second liquid 54.

Within the reaction chamber 12, there is also provided a (one or more) sample collector 30, which is adapted to collect droplets of liquid and transfer them preferably as a miniature stream of liquid to a conversion detector (the word detector according to the present invention includes the meaning of monitor) 32 through sample line 33. The conversion detector 32 may also monitor the amount of first reactant and the amount of the intermediate oxidation product as the first liquid enters the atomizer through appropriate sample line(s), not shown for purposes of clarity. This information along with information on the nature and quantity of what is added in line 41, for example, can accurately determine the amounts of intermediate oxidation product and first reactant going to the atomizer 26. The conversion in the second liquid 54 may also be detected and monitored through sample line 33', which connects line 24*a* with the conversion detector 32.

The device 10 also comprises a controller 35, preferably computerized, which is fed information regarding temperature through input lines 60', 60*a*' and 60*b*'. The controller 35 is also fed information regarding conversion of reactants to intermediate oxidation product from detector 32 through input line 31. In turn, the controller 35 controls, through one ore more output lines 36, any of a plurality of means for adjusting conversions and/or temperatures in order to control the oxidation rate, as described in detail in our five aforementioned copending applications, which have been incorporated herein by reference. Such means and their operation, which are described in said applications, include but are not limited to heat exchangers (for example heat exchanger 45 in line 41), and other means for changing the atomization temperature, the reaction pressure, the atomization distance, the average droplet diameter, the first flow rate (rate of production of droplets from the first liquid), the second flow rate (flow rate of the gas), the volatilization rate (volatilization of volatile ingredients contained in the droplets), the first content (the content of first reactant in the first liquid), the second content (content of oxidant in the gas), the catalyst content (in the first liquid), and a combination thereof. For purposes of brevity and clarity these means have not been include in FIG. 1.

The monitor or detector 32 may be any instrument which is adaptable to detect the intermediate oxidation product or products. It may, for example, comprise a chromatography apparatus (such as GC and/or HPLC, for example), a UV spectrograph, an IR spectrograph, a visible light spectrograph, a mass spectrometer, a NMR instrument, a conductivity monitor, an ionization detector, a flame detector, any other suitable instrument, or a combination thereof.

In the case that the intermediate oxidation product is a non-volatile acid, it is preferable that the monitor or detector 32 comprises a HPLC (High Pressure/Performance Liquid Chromatography instrument) in combination with a UV monitor. It is also preferable that the HPLC instrument has more than one columns, so that if the separation time in a column is longer than desired, consecutive samples are introduced in different columns and a multiplicity of separations are conducted in parallel so that the interval between monitoring consecutive samples falls within desired limits.

If it is desired to also analyze also non-polar organic moieties, it would be preferable to also include a gas chromatographic monitor or detector coupled with an appropriate monitor, such as an ionization monitor, for example.

A combination of HPLC and GC may be utilized in case that polar and non-polar ingredients are involved.

The methods and the devices of the instant invention are particularly suitable for oxidation reactions of organic compounds, wherein the major portion of the oxidation product is an oxidation intermediate different than CO, $CO_2$, or a mixture thereof. One of the reasons why this is so, is that, due to the intricate criticalities of the present invention, the reaction rates, reaction homogeneity, yield, and other important properties are considerably improved, while in the absence of said criticalities complete oxidation to $CO/CO_2$ would take place. Actually, the same conditions of atomization without said criticalities, are presently used in combustion engines of automobiles and other devices, to substantially completely oxidize (combust or bum in other words) organic compounds such as gasoline to a mixture of $CO/CO_2$.

In contrast, according to the present invention, if for example, the first reactant is cyclohexane, the major portion of the oxidation product may be substantially cyclohexanol, cyclohexanone, cyclohexylhydroperoxide, caprolactone, adipic acid, the like, and mixtures thereof. Organic acids are preferable intermediate oxidation products.

The operation of the embodiments of the instant invention, will be discussed for any non-destructive oxidation encompassed by the claims, and at the same time it will be exemplified, by using cyclohexane as a first reactant, oxygen as the oxidant in the gas, and adipic acid as the intermediate oxidation product. The term "intermediate oxidation product", as aforementioned, signifies that the oxidation stops before substantially oxidizing the first reactant to carbon monoxide, carbon dioxide, or mixtures thereof.

It should be noted that FIG. 1 represents more than one embodiment of the instant invention. Although three thermocouples and two sampling lines regarding conversion are shown, a smaller or larger number of these elements may be used. Minimally, however, one thermocouple or one sample line has to be utilized. In addition, the device 10 does not necessarily have to have all the elements shown, such as for example device(s) 12*a*.

In operation, a first liquid containing the first reactant, cyclohexane for example, enters the reaction chamber 12 through line 42 and it is atomized by the atomizer 26 and nozzles 27, in a manner to form a plurality of droplets 48. The first liquid enters the atomizer at a desired atomization temperature, which in the case of cyclohexane is preferably in the range of 50°–150° C., more preferably in the range of 80°–130° C., and even more preferably in the range of 90°–120°. Other temperatures may of course be used depending on the particular circumstances. Atomization temperature of the first liquid is the temperature of the liquid just before it is atomized. The temperature of the just formed droplets may be the same or different than the atomization temperature. In the case of cyclohexane, the first liquid also preferably contains a solvent, such as acetic acid, for example, a catalyst, such as a cobalt compound, soluble in the first liquid, for example, and an initiator, such as cyclohexanone, methylethylketone, acetaldehyde, the like, and mixtures thereof, for example. The pressure in the case of oxidation of cyclohexane to adipic acid should preferably be high enough to maintain the cyclohexane, solvents, initiators, etc., substantially in the liquid state. Although pressures even in excess of 1,000 psia are possible, pressures in the range of 100 to 400 psia are preferable, and pressures in the range of 150 to 300 psia more preferable. These pressures should be such as to maintain the raw materials in the liquid state.

At the same time that the first liquid is being atomized, a gas containing the oxidant, preferably oxygen in the case of cyclohexane, enters the chamber 12 through the gas inlet feed line 36, in the vicinity of the lower end 16 of the chamber 12. The gas, in addition to the oxidant, may also contain rather inert gases, such as nitrogen and/or carbon dioxide for example. Off gases, mixed with vapors of reactants, solvents, mist, and the like exit the reaction chamber through outlet gas line 25.

As the droplets fall in a downwardly direction from the atomizer 26, they start reacting with the oxidant, which is oxygen for example. The second liquid 54 is removed, preferably continuously, through the liquid outlet 22, and it is pumped through liquid outlet line 24 by means of pump 18.

If continuous operation is desired, the second liquid is initially recirculated through lines **24*a*, 24*b*, and 42 to the atomizer 26, until the conversion has reached a desired level. At that point, valve 19 opens to a desired degree so that some of the second liquid, having the desired conversion level, passes to either the separator 15 through lines 24*c* and 24*d* or to device 112*a* through lines 24*c* and 24*f* for further treatment. The valve 19*a* may direct the whole liquid portion from line 24*c* to either the separator 15 or the device 12*a*, or partially to separator 15 and partially to device 12*a*, depending on the particular circumstances. The rest of the second liquid, which does not enter line 24*c*, is recirculated to the atomizer 26 through lines 24*b* and 42. Replenishment liquid containing first reactant, etc., enters the system through replenishment line 41. The composition and amount of the replenishment liquid entering the system is such as to replenish, preferably quantitatively, the amounts of ingredients removed through line 24*c***.

In case of a batch operation, as the device 10 is supplied with adequate first liquid through replenishment line 41, the whole amount of the second liquid is recirculated to the atomizer 26 through lines **24*b* and 42, until a desired conversion has been reached, at which point the second liquid is removed from the reaction chamber 12 through properly activated valve 19 (and, if so desired, valve 19*a*) and line 24*c* to enter separator 15 or device 12*a*, or partially separator 15 and partially device 12*a* for further treatment. New first liquid enters the system through replenishment line 41**, and the cycle is repeated.

In the separator 15, the intermediate oxidation product, adipic acid for example, is separated from the liquids by techniques well known to the art. In some occasions, other by-products of the oxidation may also be removed in the separator, if so desired. Reactants, solvents, catalysts, and the like, return to a recirculation tank (not shown) through line 11. If at least part of the second liquid 54 is at least partially directed to device **12*a*, it may also be redirected to separator 15, after any treatment in the device 12*a*, through line 11*a***.

A part of the droplets 48 fall onto thermocouple **60*a*, which in turn feeds the temperature information to the controller 35 through input line 60*a*'. The atomization temperature and the temperature of the second liquid are also fed to the controller 35 through input lines 60' and 60*b*', respectively. At the same time, part of the droplets also fall into the sample collector 30, from where, they are directed to the conversion detector or monitor 32, to be analyzed regarding conversion. If solids are present in the droplets, care should be taken to prevent clogging of liquid transporting lines by use of appropriate dilution, and the like. In addition, a small stream of second liquid is directed to the conversion detector 32 through line 33' for analysis regarding conversion. As aforementioned, in the case of adipic or other acid formation, it is preferable that the monitor 32 comprises a chromatography apparatus, which more preferably is a High Performance (or Pressure) Liquid Chromatography apparatus (HPLC), and even more preferably combined with a GC (gas chromatography) apparatus. This system, as also mentioned earlier, may preferably have an adequate number of columns, so that it is capable of making a respective number of overlapping determinations of the intermediate oxidation product present in the or of the second liquid 54**, so that the respective conversion of the first reactant to intermediate reaction product is checked as frequently as desired in each particular case. If the column, for example, separates the intermediate oxidation product in 8 minutes, and the desired interval between determinations is 2 minutes in a particular case, four columns are needed.

Sampling of the liquid in other locations, may also be desirable, and it may be carried out in the same detector **32*n*** or in a different detector (not shown).

The information obtained in the conversion detector or monitor 32 is fed to computerized controller 35 through its input line 31, where it is processed by well known to the art techniques along with information received through lines 60', **60*a*', and 60*b*'** regarding the respective temperatures.

The controller 35 controls heat exchanger 45 (not shown) or any of a plurality of means, mentioned earlier, which may be utilized to adjust any determinant, as described in detail in our co-pending applications. For purposes of simplicity, brevity, and clarity, the heat exchanger 45, which exemplifies one means for adjusting the determinants to control the oxidation rate, will be discussed here, with the understanding that the same principles apply regarding any other means.

It is preferable that in controlling the reaction rate, the temperature of thermocouple 60, measuring the temperature inside the reactor, takes precedence, followed by the atomization temperature of thermocouple 60, and then followed by the temperature of the second liquid 54, as measured by thermocouple **60*b*. The conversion of first reactant to intermediate oxidation product in the sample collector 30 takes then precedence, followed by the conversion of first reactant to oxidation product as provided in the path of lines 24*a* and 33'. Although it is preferable, and sometimes critical, especially in the case of fast reactions or very long reaction chambers, to adjust more than one determinant for controlling the oxidation rate, there are other occasions, especially in the case of relatively slow reactions, which permit the use of only single determinant. As a matter of fact, in the case of very fast reactions or very long reaction chambers, it is preferable to use a plurality of thermocouples 60*a* and sample collectors 30**, so that the temperature and conversion are monitored in the whole length of the reaction chamber.

The controller 35 is preferably adapted, by well known to the art techniques, to make decisions regarding what action to take in order to adjust a determinant, not only by the absolute values of the measurements, but also by the differences of the absolute values and the rate that any change in determinant takes place. For example, if the temperature difference between thermocouples 60 and **60*a* rises at a faster rate than desired, the controller will have to order more drastic measures than if the temperature in thermocouple 60a albeit high, does not rise at a high rate, especially as compared to the temperature of thermocouple 60. The same applies between thermocouples 60a, if more thermocouples 60a are present, and between conversions and conversion changes from samples provided by different sample collectors 30, if more sample collectors 30** are available.

Assuming that at least one thermocouple 60a is present, the controller 35 makes decisions based on the temperature provided by thermocouple 60a first. If that temperature is above the desired temperature range, heat exchanger 45 is ordered by the controller 35 to lower the temperature of the first liquid passing from line 42 to the atomizer 26. This change is preferably conducted in increments, preferably in the range of 10 to 50%, and more preferably in the range of 10 to 30% of the temperature at which the liquid enters the heat exchanger, as measured by a thermocouple (not shown for purposes of clarity) and provided to controller 35. However, other ranges may be more appropriate, depending on the particular conditions, materials, previous determination, and the like. For example, if a 10% decrease in temperature is found not to have an appreciable result, the following increment may be 30%, for example. On the other hand, if a 10% decrease in the atomization distance results in an overwhelming change in temperature, the next increment may be 5%, for example, until the temperature falls within the desirable range, preferably in the most desirable range, and even more preferably if it attains a value in the vicinity of its most preferred set value.

In the case of oxidation of cyclohexane to adipic acid, for example, the preferred temperature range is 50°–150° C., more preferably 80°–130° C., and even more preferably 90°–120° C. Depending on the particular circumstances however, other temperatures, considerably higher or considerably lower than the ones given above may be more suitable, even in the case of cyclohexane to adipic acid.

After the temperature is found to be within the most desired range, it continues to be monitored with a goal in most cases to stay somewhere in the vicinity of the middle value of said most desired range. Continuous monitoring and control are, of course, highly desirable, since the conditions in the reaction chamber may vary, causing changes in the pre-coalescing temperature.

The desired range may be constant or it may vary with time, conversion, and other desired parameters.

After the first determinant is within its desirable range, the other determinants may be directed toward their desirable ranges, one after the other in the order described above, for as long as they do not interfere with the first determinant. If the first determinant is absent, the second determinant takes precedence, and the same technique is followed, until the second determinant falls within its predetermined range, as described above for the first determinant.

Usually, the predetermined range for thermocouple 60 should be lower than the range for thermocouple 60a. The temperature changes shown by thermocouple 60b are necessarily slower than the ones shown by thermocouple 60a, due to the mass of the second liquid 54. In case that the determinant is the temperature of thermocouple 60b, it is important that the volume of the second liquid 54 at the lower end 16 of the reaction chamber 12 is as small as possible to respond as fast as possible in temperature changes of the droplets in the reaction chamber 12.

It is highly preferable that one temperature determinant and one conversion determinant are utilized at the same time for controlling the oxidation rate.

Fast oxidations and/or long reaction chambers, as already mentioned, may require more than one sample collector 30, while slow oxidations and/or short reaction chambers may rely only in conversion measured in the second liquid 54 through line 33'.

Conversion measurements between the initial location, which is between the atomizer and the point at which the lines 41 and 42 meet, and any subsequent point before any recirculation or after any number of recirculations, taking into account any external influences, such as new additions and the like, for example, may be made, and the oxidation rate may be calculated therefrom. The controller 35 gives orders to the heat exchanger 45 from conversion data in a similar manner as it does from temperature data. Conversions per time interval of measurement (in a single pass or any desired number of recirculations) may preferably be maintained between 0.05% and 80%, although other values may be appropriate, depending on the particular case. This is also true in the case of adipic acid formation, where in some occasions the values of conversion may be extremely small and in other occasions extremely large. The range of 0.05% to 80%, however, still remains a preferable range.

As aforementioned, oxidations according to this invention, are non-destructive oxidations, wherein the oxidation product is different than carbon monoxide, carbon dioxide, and a mixture thereof. Of course, small amounts of these compounds may be formed along with the oxidation product, which may be one product or a mixture of products.

Examples include, but of course, are not limited to preparation of $C_5$–$C_8$ aliphatic dibasic acids from the corresponding saturated cycloaliphatic hydrocarbons, such as for example preparation of adipic acid from cyclohexane;

preparation of $C_5$–$C_8$ aliphatic dibasic acids from the corresponding ketones, alcohols, and hydroperoxides of saturated cycloaliphatic hydrocarbons, such as for example preparation of adipic acid from cyclohexanone, cyclohexanol, and cyclohexylhydroperoxide;

preparation of $C_5$–$C_8$ cyclic ketones, alcohols, and hydroperoxides from the corresponding saturated cycloaliphatic hydrocarbons, such as for example preparation of cyclohexanone, cyclohexanol, and cyclohexylhydroperoxide from cyclohexane; and preparation of aromatic multi-acids from the corresponding multi-alkyl aromatic compounds, such as for example preparation of phthalic acid, isophthalic acid, and terephthalic acid from o-xylene, m-xylene and p-xylene, respectively.

Regarding adipic acid, the preparation of which is especially suited to the methods and apparatuses of this invention, general information may be found in a plethora of U.S. Patents, among other references. These, include, but are not limited to:

U.S. Pat. Nos. 2,223,493; 2,589,648; 2,285,914; 3,231,608; 3,234,271; 3,361,806; 3,390,174; 3,530,185; 3,649,685; 3,657,334; 3,957,876; 3,987,100; 4,032,569; 4,105,856; 4,158,739 (glutaric acid); 4,263,453; 4,331,608; 4,606,863; 4,902,827; 5,221,800; and 5,321,157.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. Individual sections of the embodiments may also be practiced individually or in combination with other individual sections of embodiments or embodiments in their totality, according to the present invention. These combinations also lie within the realm of the present invention. Furthermore, any attempted explanations in the discussion are only speculative and are not intended to narrow the limits of this invention.

What is claimed is:

1. A method of preparing an intermediate oxidation product from a first liquid containing a first reactant and a gas containing an oxidant, the method comprising the steps of:

atomizing the first liquid to form a plurality of droplets in the gas at an atomization temperature and at an atomization distance from a mass of a second liquid;

causing a substantially non-destructive oxidation at an oxidation rate between the first reactant and the oxidant to form the intermediate oxidation product;

coalescing the droplets into the mass of the second liquid;

controlling the oxidation rate by adjusting a parameter or determinant selected from a group consisting of atomization temperature, droplet temperature, temperature of the second liquid, conversion of first reactant to intermediate product in the droplets, conversion of first reactant to intermediate product in the first liquid, conversion of first reactant to intermediate product in the second liquid, and a combination thereof, to be within respective predetermined ranges; and separating the intermediate oxidation product from the second liquid.

2. A method as defined in claim 1, wherein the parameter or determinant is selected from a group consisting of droplet temperature, conversion of first reactant to intermediate product in the droplets, conversion of first reactant to intermediate product in the second liquid, and a combination thereof.

3. A method as defined in claim 2, wherein the parameter or determinant is droplet temperature.

4. A method as defined in claim 2, wherein the parameter or determinant is selected from a group consisting of conversion of first reactant to intermediate product in the droplets, conversion of first reactant to intermediate product in the second liquid, and a combination thereof.

5. A method as defined in claim 4, wherein the parameter or determinant is conversion of first reactant to intermediate product in the droplets.

6. A method as defined in claim 4, wherein the parameter or determinant is conversion of first reactant to intermediate product in the second liquid.

7. A method as defined in claim 1, wherein the droplets have an average droplet diameter and are produced at a desired first flow rate, the gas flows at a second flow rate, the droplets contain volatile ingredients volatilizing at a volatilization rate, the first liquid contains first reactant at a first content, the first liquid contains catalyst at a catalyst content, the gas contains oxidant at a second content, and adjusting said parameter is performed by a step selected from a group consisting of changing the atomization temperature, the reaction pressure, the atomization distance, the average droplet diameter, the first flow rate, the second flow rate, the volatilization rate, the first content, the second content, the catalyst content, and a combination thereof.

8. A method as defined in claim 3, wherein the droplets have an average droplet diameter and are produced at a desired first flow rate, the gas flows at a second flow rate, the droplets contain volatile ingredients volatilizing at a volatilization rate, the first liquid contains first reactant at a first content, the first liquid contains catalyst at a catalyst content, the gas contains oxidant at a second content, and adjusting said parameter is performed by a step selected from a group consisting of changing the atomization temperature, the reaction pressure, the atomization distance, the average droplet diameter, the first flow rate, the second flow rate, the volatilization rate, the first content, the second content, the catalyst content, and a combination thereof.

9. A method as defined in claim 5, wherein the droplets have an average droplet diameter and are produced at a desired first flow rate, the gas flows at a second flow rate, the droplets contain volatile ingredients volatilizing at a volatilization rate, the first liquid contains first reactant at a first content, the first liquid contains catalyst at a catalyst content, the gas contains oxidant at a second content, and adjusting said parameter is performed by a step selected from a group consisting of changing the atomization temperature, the reaction pressure, the atomization distance, the average droplet diameter, the first flow rate, the second flow rate, the volatilization rate, the first content, the second content, the catalyst content, and a combination thereof.

10. A method as defined in claim 6, wherein the droplets have an average droplet diameter and are produced at a desired first flow rate, the gas flows at a second flow rate, the droplets contain volatile ingredients volatilizing at a volatilization rate, the first liquid contains first reactant at a first content, the first liquid contains catalyst at a catalyst content, the gas contains oxidant at a second content, and adjusting said parameter is performed by a step selected from a group consisting of changing the atomization temperature, the reaction pressure, the atomization distance, the average droplet diameter, the first flow rate, the second flow rate, the volatilization rate, the first content, the second content, the catalyst content, and a combination thereof.

11. A method as defined in claim 1, wherein the first reactant comprises a compound selected from a group consisting of cyclohexane, cyclohexanone, cyclohexanol, cyclohexylhydroperoxide, o-xylene, m-xylene, p-xylene, a mixture of at least two of cyclohexane, cyclohexanone, cyclohexanol, cyclohexylhydroperoxide, and a mixture of at least two of o-xylene, m-xylene, p-xylene;

the oxidant comprises oxygen; and a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

12. A method as defined in claim 3, wherein the first reactant comprises a compound selected from a group consisting of cyclohexane, cyclohexanone, cyclohexanol, cyclohexylhydroperoxide, o-xylene, m-xylene, p-xylene, a mixture of at least two of cyclohexane, cyclohexanone, cyclohexanol, cyclohexylhydroperoxide, and a mixture of at least two of o-xylene, m-xylene, p-xylene;

the oxidant comprises oxygen; and a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

13. A method as defined in claim 5, wherein the first reactant comprises a compound selected from a group consisting of cyclohexane, cyclohexanone, cyclohexanol, cyclohexylhydroperoxide, o-xylene, m-xylene, p-xylene, a mixture of at least two of cyclohexane, cyclohexanone, cyclohexanol, cyclohexylhydroperoxide, and a mixture of at least two of o-xylene, m-xylene, p-xylene;

the oxidant comprises oxygen; and a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

14. A method as defined in claim 6, wherein the first reactant comprises a compound selected from a group consisting of cyclohexane, cyclohexanone, cyclohexanol, cyclohexylhydroperoxide, o-xylene, m-xylene, p-xylene, a mixture of at least two of cyclohexane, cyclohexanone, cyclohexanol, cyclohexylhydroperoxide, and a mixture of at least two of o-xylene, m-xylene, p-xylene;

the oxidant comprises oxygen; and a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

15. A method as defined in claim 1, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

16. A method as defined in claim 3, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

17. A method as defined in claim 5, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

18. A method as defined in claim 6, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

19. A method as defined in claim 7, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

20. A method as defined in claim 8, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

21. A method as defined in claim 9, wherein a major portion of the intermediate oxidation product comprises a compound selected from a group consisting of adipic acid, cyclohexanol, cydohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

22. A method as defined in claim 10, wherein a major portion of the intermediate oxidation product comprises a compound selected from a group consisting of adipic acid, cyclohexanol, cyclohexanone, cyclohexylhydroperoxide, phthalic acid, isophthalic acid, terephthalic acid, a mixture of at least two of adipic acid, cyclohexanone, cyclohexanol, and cyclohexylhydroperoxide, and a mixture of at least two of phthalic acid, isophthalic acid, and terephthalic acid.

* * * * *